United States Patent
Li et al.

(10) Patent No.: US 11,615,214 B2
(45) Date of Patent: Mar. 28, 2023

(54) CRYPTOGRAPHIC KEY MANAGEMENT

(71) Applicant: Micron Technology, Inc., Boise, ID (US)

(72) Inventors: Juane Li, Milpitas, CA (US); Jiangli Zhu, San Jose, CA (US); Ying Yu Tai, Mountain View, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/913,748

(22) Filed: Jun. 26, 2020

(65) Prior Publication Data

US 2021/0019450 A1 Jan. 21, 2021

Related U.S. Application Data

(60) Provisional application No. 62/874,437, filed on Jul. 15, 2019.

(51) Int. Cl.
| | | |
|---|---|---|
| *G06F 21/79* | (2013.01) | |
| *G06F 21/60* | (2013.01) | |
| *H04L 9/08* | (2006.01) | |
| *G11C 29/44* | (2006.01) | |
| *G11C 29/42* | (2006.01) | |

(52) U.S. Cl.
CPC ............ *G06F 21/79* (2013.01); *G06F 21/602* (2013.01); *G11C 29/42* (2013.01); *G11C 29/44* (2013.01); *H04L 9/0866* (2013.01); *H04L 9/0869* (2013.01); *H04L 9/0891* (2013.01)

(58) Field of Classification Search
CPC ....... G06F 21/79; G06F 21/602; G11C 29/44; G11C 29/42; H04L 9/0866; H04L 9/0869; H04L 9/0891; H04L 9/0822
See application file for complete search history.

(56) References Cited

U.S. PATENT DOCUMENTS

| | | | | |
|---|---|---|---|---|
| 2003/0099362 A1* | 5/2003 | Rollins | ................. | H04L 63/062 380/278 |
| 2008/0065906 A1* | 3/2008 | Itagaki | .................... | G06F 21/80 713/193 |
| 2010/0008510 A1* | 1/2010 | Zayas | .................... | G06F 21/572 380/283 |
| 2012/0321078 A1* | 12/2012 | Chambers | ............. | G06F 15/173 380/44 |
| 2014/0006806 A1* | 1/2014 | Corella | .................... | G06F 21/62 713/193 |
| 2015/0261972 A1* | 9/2015 | Lee | ..................... | G06F 21/6218 713/165 |

(Continued)

*Primary Examiner* — Philip J Chea
*Assistant Examiner* — Sangseok Park
(74) *Attorney, Agent, or Firm* — Holland & Hart, LLP

(57) ABSTRACT

Methods, systems, and devices for cryptographic key management are described. A memory device can issue, by a firmware component, a command to generate a first cryptographic key for encrypting or decrypting user data stored on a memory device. The memory device can generate, by a hardware component, the first cryptographic key based on the command. The memory device can encrypt, by the hardware component, the first cryptographic key using a second cryptographic key and an initialization vector. The memory device can store the encrypted first cryptographic key in a nonvolatile memory device separate from the hardware component.

20 Claims, 12 Drawing Sheets

(56) References Cited

U.S. PATENT DOCUMENTS

| | | | | |
|---|---|---|---|---|
| 2017/0250801 A1* | 8/2017 | Chen | ................... | H04L 9/085 |
| 2018/0176014 A1* | 6/2018 | Campagna | ............ | H04L 9/0618 |
| 2018/0278415 A1* | 9/2018 | Von Der Lippe | ..... | H04L 9/0866 |
| 2019/0173674 A1* | 6/2019 | Agarwal | ............... | H04L 9/0894 |
| 2020/0382289 A1* | 12/2020 | Xue | ..................... | H04L 9/0897 |

\* cited by examiner

CRYPTOGRAPHIC KEY MANAGEMENT

CROSS REFERENCE

The present application for patent claims the benefit of U.S. Provisional Patent Application No. 62/874,437 by LI et al., entitled "CRYPTOGRAPHIC KEY MANAGEMENT," filed Jul. 15, 2019, assigned to the assignee hereof, and expressly incorporated by reference in its entirety herein.

TECHNICAL FIELD

The following relates generally to a memory sub-system and more specifically to cryptographic key management for a memory sub-system.

BACKGROUND

A memory sub-system can include one or more memory devices that store data. The memory devices can be, for example, nonvolatile memory devices and volatile memory devices. In general, a host system can utilize a memory sub-system to store data at the memory devices and to retrieve data from the memory devices.

DETAILED DESCRIPTION

Figure 1:
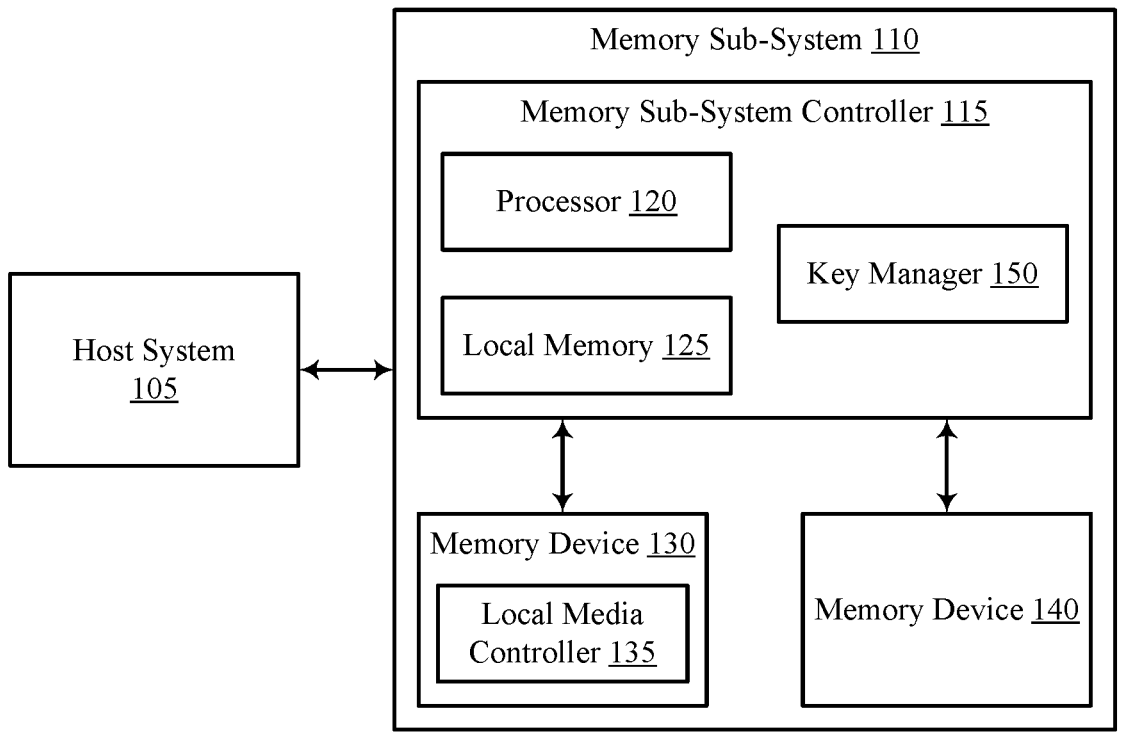
FIG. 1 illustrates an example of a computing system in accordance with some embodiments of the present disclosure.

Aspects of the present disclosure are directed to cryptographic key management. A memory sub-system can be a storage device, a memory module, or a hybrid of a storage device and memory module. Examples of storage devices and memory modules are described with reference to FIG. 1. In general, a host system can utilize a memory sub-system that includes one or more components, such as memory devices that store data. The host system can provide data to be stored at the memory sub-system and can request data to be retrieved from the memory sub-system.

The host system can send access requests to the memory sub-system, such as to store data at the memory sub-system and to read data from the memory sub-system. The data to be read and written are hereinafter referred to as "user data". A host request can include a logical address (e.g., logical block address (LBA)) for the user data, which is the location the host system associates with the user data. The logical address (e.g., LBA) can be part of metadata for the user data. Data (e.g., user data and corresponding metadata) stored at the memory sub-system can be encrypted by an encryption key (e.g., a cryptographic key for encrypting data). This can increase the security of the data stored at the memory sub-system. Securing the data can, for example, decrease the likelihood that a third party device or, in some cases the firmware of the memory sub-system, can access the data. When data is accessed by the host device, the memory sub-system can decrypt the data prior to communicating the data to the host device. The memory sub-system can store cryptographic keys (e.g., encryption keys and decryption keys) at a volatile memory device (e.g., requiring power to store data). If the memory sub-system loses power, the memory sub-system cannot retain the cryptographic keys stored at the volatile memory device. Without the cryptographic keys, the encrypted data can be inaccessible. Further, nonvolatile memory devices can be accessed by third parties or the firmware of the memory sub-system. Therefore, storing the cryptographic keys at nonvolatile memory devices can decrease the security of the encrypted data.

Aspects of the present disclosure address the above and other deficiencies by encrypting cryptographic keys prior to storing the cryptographic keys at the nonvolatile memory device. Encrypting the cryptographic keys prior to storing them at the nonvolatile memory device can increase the security of the cryptographic keys. That is, a third party, or even the firmware associated with the memory sub-system, cannot access the decrypted cryptographic keys.

The memory sub-system can include a hardware component to manage cryptographic key generation and storage (e.g., a key manager). The memory sub-system can indicate to the hardware component to generate a pair of cryptographic keys (e.g., an encryption key and a corresponding decryption key). The hardware component can generate the pair of cryptographic keys using randomization techniques and store the pair of cryptographic keys at a volatile memory device. The hardware component can subsequently encrypt the cryptographic keys using a second cryptographic key (e.g., a public key) and an initialization vector. In some cases, the hardware component can generate error correction information for the encrypted cryptographic keys. The hardware component can communicate the pair of cryptographic keys (e.g., by a firmware component) and the second cryptographic key for storage at a volatile memory device. In some cases, the hardware component can also communicate the error correction information for storage at the volatile memory device.

In a case that the hardware component boots or starts up (e.g., after being connected to a power source), the hardware component can receive the encrypted cryptographic keys and the second cryptographic key from the nonvolatile memory device. The hardware component can also, in some cases, receive error correction information associated with the encrypted cryptographic keys. The hardware component can perform an error correction operation on the encrypted cryptographic keys using the error correction information to detect and/or correct errors within the encrypted cryptographic keys. Then, the hardware component can decrypt the encrypted cryptographic keys using the second cryptographic key and the initialization vector. The hardware component can store the cryptographic keys at a volatile memory device and provide the cryptographic keys as necessary for various access operations between the memory sub-system and the host device.

Features of the disclosure are initially described in the context of a computing environment as described with reference to FIG. 1. Features of the disclosure are described in the context of systems and methods as described with reference to FIGS. 2 through 6. These and other features of the disclosure are further illustrated by and described with reference to an apparatus diagram, flowcharts, and a computer diagram that relate to cryptographic key management as described with references to FIGS. 7 through 12.

FIG. 1 illustrates an example computing system 100 that includes a memory sub-system 110 in accordance with some embodiments of the present disclosure. The memory sub-system 110 can include media, such as one or more non-volatile memory devices (e.g., memory device 130), one or more volatile memory devices (e.g., memory device 140), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of nonvolatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 105 that is coupled with a memory system. The memory system can be one or more memory sub-systems 110. In some examples, the host system 105 is coupled with different types of memory sub-systems 110. FIG. 1 illustrates one example of a host system 105 coupled with one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 105 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 105 uses the memory sub-system 110, for example, to write data to the memory sub-system 110 and read data from the memory sub-system 110.

The host system 105 can be coupled to the memory sub-system 110 using a physical host interface. Examples of a physical host interface include, but are not limited to, a serial advanced technology attachment (SATA) interface, a peripheral component interconnect express (PCIe) interface, universal serial bus (USB) interface, Fiber Channel, Serial Attached SCSI (SAS), a double data rate (DDR) memory bus, a dual in-line memory module (DIMM) interface (e.g., DIMM socket interface that supports Double Data Rate (DDR)), Open negative-and (NAND) Flash Interface (ONFI), Double Data Rate (DDR), Low Power Double Data Rate (LPDDR), or any other interface. The physical host interface can be used to transmit data between the host system 105 and the memory sub-system 110. The host system 105 can further utilize an NVM Express (NVMe) interface to access the components (e.g., memory devices 130) when the memory sub-system 110 is coupled with the host system 105 by the PCIe interface. The physical host interface can provide an interface for passing control, address, data, and other signals between the memory sub-system 110 and the host system 105. FIG. 1 illustrates a memory sub-system 110 as an example. In general, the host system 105 can access multiple memory sub-systems via a same communication connection, multiple separate communication connections, and/or a combination of communication connections.

The memory devices 130, 140 can include any combination of the different types of nonvolatile memory devices and/or volatile memory devices. The volatile memory devices (e.g., memory device 140) can be, but are not limited to, random access memory (RAM), such as dynamic RAM (DRAM) and synchronous DRAM (SDRAM).

Some examples of nonvolatile memory devices (e.g., memory device 130) includes a NAND type flash memory and write-in-place memory, such as a 3D cross-point type flash memory, which is a cross-point array of nonvolatile memory cells. A cross-point array of nonvolatile memory can perform bit storage based on a change of bulk resistance, in conjunction with a stackable cross-gridded data access array. Additionally, in contrast to many flash-based memories, cross-point nonvolatile memory can perform a write in-place operation, where a nonvolatile memory cell can be programmed without the nonvolatile memory cell being previously erased. NAND type flash memory includes, for example, two-dimensional NAND (2D NAND) and three-dimensional NAND (3D NAND).

Although nonvolatile memory devices such as 3D cross-point type memory are described, the memory device 130 can be based on any other type of nonvolatile memory, such as NAND, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

In some embodiments, each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination of such. The hardware can include digital circuitry with dedicated (i.e., hard-coded) logic to perform the operations described herein. The memory sub-system controller 115 can include a processor chipset that includes one or more cores. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some examples, the local memory 125 can include memory registers storing memory pointers, fetched data, etc. The local memory 125 can also include read-only memory (ROM) for storing micro-code. While the example memory sub-system 110 in FIG. 1 has been illustrated as including the memory sub-system controller 115, in another example of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error correction code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 105 via the physical host interface. The host interface circuitry can convert the commands received from the host system into command instructions to access the memory devices 130 and/or the memory device 140 as well as convert responses associated with the memory devices 130 and/or the memory device 140 into information for the host system 105.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, the memory devices 130 can be locally managed memory devices, which is a raw memory device combined with a local controller (e.g., local controller 135) that performs memory management operations on the memory device 130 within the same memory device package. An example of a managed memory device is a managed NAND (MNAND) device.

The memory sub-system 110 includes a key manager 150 that can manage the cryptographic keys used for encrypting or decrypting user data stored at the memory devices 130 or 140. In some examples, the memory sub-system controller 115 includes at least a portion of the key manager 150. For example, the memory sub-system controller 115 can include a processor 120 (e.g., a processing device) configured to execute instructions stored in local memory 125 for performing the operations described herein. In some examples, the key manager 150 is part of the host system 105, an application, or an operating system.

The key manager 150 can generate and store cryptographic keys. The cryptographic keys can be used to increase the security of data stored at the memory devices 130 and 140. For example, a first cryptographic key can encrypt data to be stored at a memory device 130 or 140, and a second cryptographic key can decrypt data being read from the memory device 130 or 140. If the key manager 150 loses power, the key manager 150 cannot retain the stored cryptographic keys. Without the cryptographic keys, the encrypted data (e.g., stored at the memory devices 130 and/or 140) can be inaccessible. Further, nonvolatile memory devices can be accessed by third parties or the firmware of the memory sub-system. Therefore, storing the cryptographic keys at nonvolatile memory devices can decrease the security of the encrypted data. Therefore, key manager 150 can encrypt cryptographic keys and store the encrypted cryptographic keys at a nonvolatile memory device. Encrypting the cryptographic keys prior to storing them at the nonvolatile memory device can increase the security of the cryptographic keys. That is, a third party, or even the firmware associated with the memory sub-system 110, cannot access the decrypted cryptographic keys. Further details with regards to the operations of the key manager 150 are described below.

Figure 2:
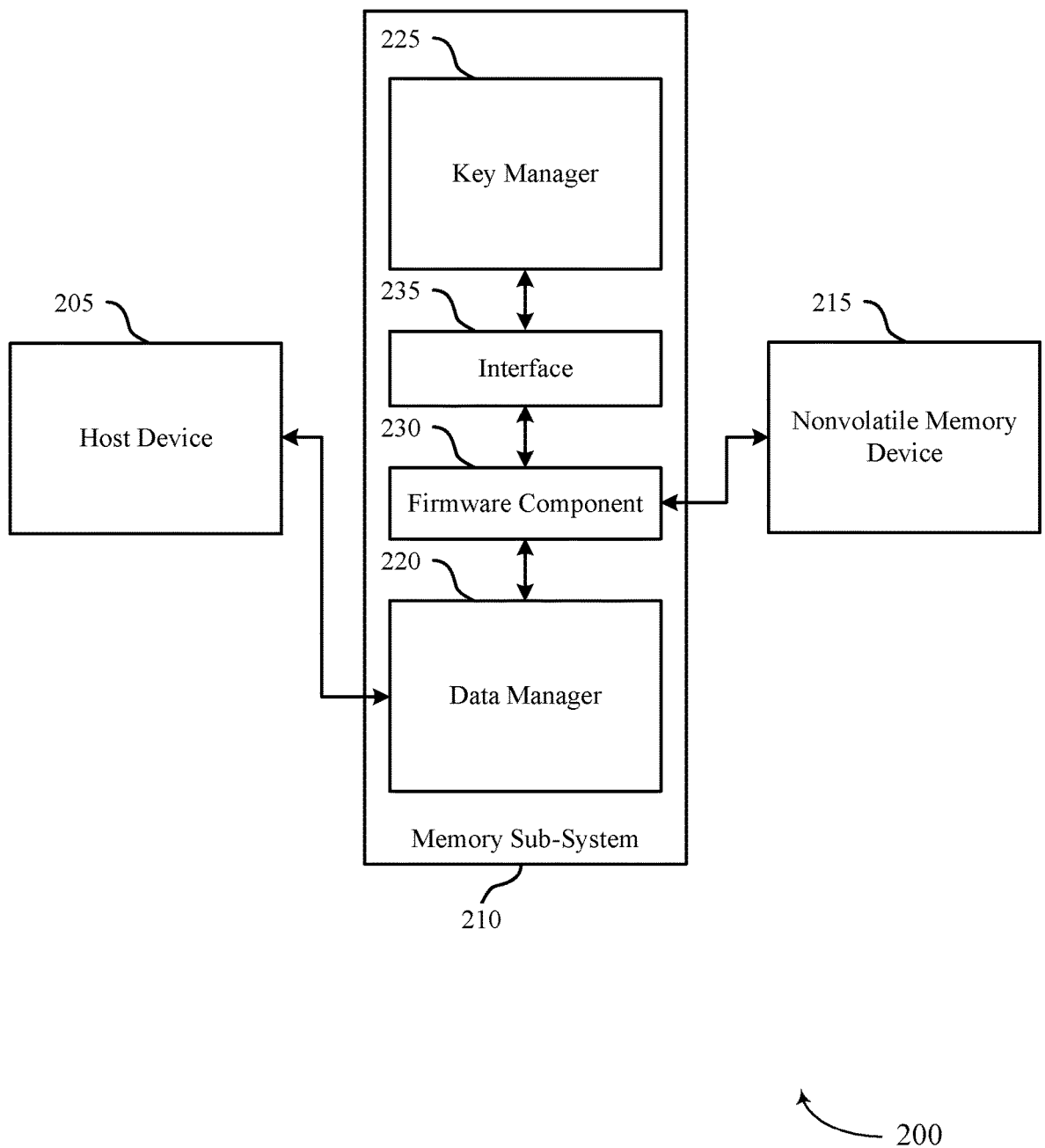
FIGS. 2 through 4 illustrate examples of systems that support cryptographic key management in accordance with some embodiments of the present disclosure.

FIG. 2 illustrates an example of a system 200 that supports cryptographic key management in accordance with some embodiments of the present disclosure. System 200 can include one or more components described herein with reference to FIG. 1, among others. For example, the system 200 can include host device 205, which can be an example of the host system 105 as described with reference to FIG. 1; a memory sub-system 210, which can be an example of the memory sub-system 110, the memory device 130, or the memory device 140 as described with reference to FIG. 1; and a key manager 225, which can be an example of key manager 150 as described with reference to FIG. 1. System 200 can further include nonvolatile memory 215.

Host device 205 can communicate access commands to memory sub-system 210. For example, host device 205 can communicate a write command to memory sub-system 210. The write command can include data to be written to a memory array at memory sub-system 210. In another example, host device 205 can communicate a read command to memory sub-system 210. When executing the read command, memory sub-system 210 can access a memory array of memory sub-system 210, read data from the memory array, and communicate the data to host device 205.

The memory sub-system 210 (e.g., a memory device) can include data manager 220, key manager 225, firmware component 230, and interface 235. The data manager 220 can manage access operations (e.g., initiated based on commands received from host device 205). For example, data manager 220 can receive access commands from the host device 205, access a memory array based on the access command, and in some cases (e.g., in a case of a write operation) communicate data to host device 205. Memory sub-system 210 can encrypt data stored at memory sub-system 210 to increase the security associated with the data. A hardware component (e.g., key manager 225) at memory sub-system 210 can manage cryptographic key storage and security. For example, key manager 225, interface 235, and firmware component 230 can enable memory sub-system 210 to encrypt (and decrypt) data stored at memory sub-system 210.

Firmware component 230 can facilitate communications between data manager 220 and key manager 225. During an execution of an access operation, data manager 220 can communicate a key request to key manager 225. The key request can include a request for a cryptographic key for encrypting data or a cryptographic key for decrypting data. Data manager 220 can communicate a key request to firmware component 230. Firmware component 230 can generate a command to supply the requested key to data manager 220. Firmware component 230 can communicate the command to key manager 225 by interface 235. Based on receiving the command, key manager 225 can communicate the requested cryptographic keys (e.g., by interface 235 and firmware component 230) to data manager 220.

In another example, data manager 220 can request a generation of one or more new cryptographic keys. Here, data manager 220 can communicate the request to firmware component 230. Firmware component 230 can generate a command indicating a generation of the one or more new cryptographic keys. Firmware component 230 can communicate the command to key manager 225 by interface 235. Based on receiving the command, key manager 225 can randomly generate the cryptographic keys and store the cryptographic keys at a volatile memory device (e.g., at key manager 225). In some cases, when key manager 225 is disconnected from a power source, key manager 225 does not retain the cryptographic keys at the volatile memory device. Without access to the cryptographic keys, user data encrypted by the cryptographic keys cannot be decrypted, making the user data inaccessible.

Key manager 225 can store the cryptographic keys at nonvolatile memory 215. Storing the cryptographic keys at nonvolatile memory 215 can enable memory sub-system 210 to recover encrypted data stored at memory sub-system 210 in an event that key manager 225 is disconnected from a power supply. But data stored at nonvolatile memory 215 can be accessed by third parties and the firmware component 230. As a result, the security provided by encrypting the user data can be diminished as the encryption and decryption keys can be accessed at nonvolatile memory 215. Prior to storing the cryptographic keys at nonvolatile memory 215, key manager 225 can encrypt the cryptographic keys using a second cryptographic key (e.g., a public key) and an initialization vector. Key manager 225 can communicate the encrypted cryptographic keys (e.g., by interface 235 and firmware component 230) and the second cryptographic key for storage at nonvolatile memory 215. Encrypting the cryptographic keys can increase the user data security. In some cases, key manager 225 can generate error correction information for the encrypted cryptographic keys. Key manager 225 can also communicate the error correction information for storage at nonvolatile memory 215.

When key manager 225 is reconnected to power (e.g., when key manager 225 boots or starts up), key manager 225 can receive the encrypted cryptographic keys and the second cryptographic key from nonvolatile memory 215 (e.g., by firmware component 230 and interface 235). Key manager 225 can also, in some cases, receive error correction information associated with the encrypted cryptographic keys. Key manager 225 can perform an error correction operation on the encrypted cryptographic keys using the error correction information to detect and/or correct errors within the encrypted cryptographic keys. Then, key manager 225 can decrypt the encrypted cryptographic keys using the second cryptographic key and the initialization vector. Key manager 225 can store the cryptographic keys at a volatile memory device (e.g., at key manager 225) and provide the cryptographic keys for various access operations between memory sub-system 210 and host device 205.

Figure 3:
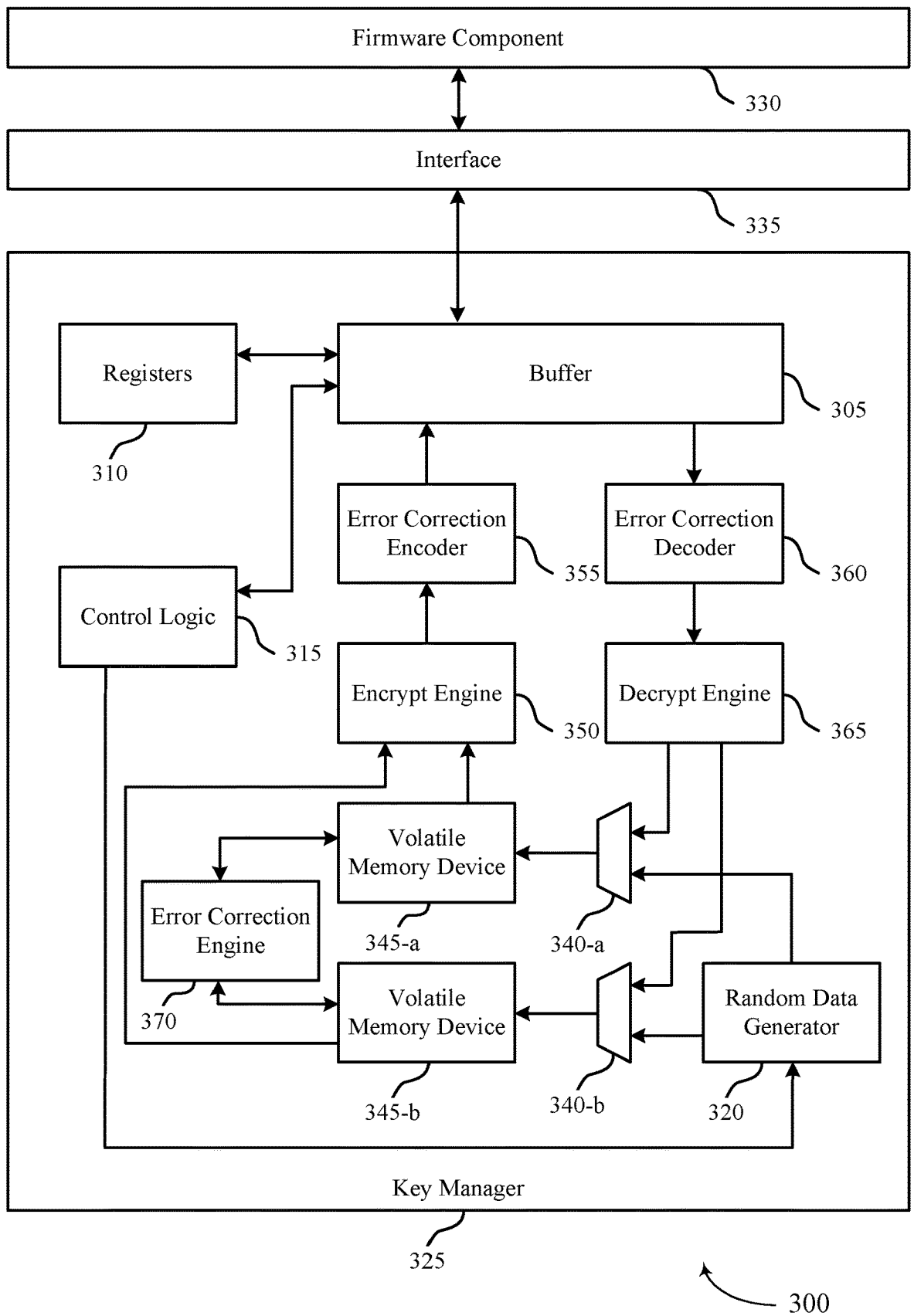

FIG. 3 illustrates an example of a system 300 that supports cryptographic key management in accordance with some embodiments of the present disclosure. System 300 can include one or more components described herein with reference to FIGS. 1 and 2, among others. For example, the system 300 can include key manager 325, which can be an example of the key manager 150 or key manager 225 as described with reference to FIGS. 1 and 2; interface 335, which can be an example of the interface 235 as described with reference to FIG. 2; and firmware component 330, which can be an example of firmware component 230 as described with reference to FIG. 2. The system 300 can be an example of a system 300 at a memory device, which can be an example of the memory sub-system 110 or memory sub-system 210 as described with reference to FIGS. 1 and 2.

Key manager 325 can receive commands from firmware component 330 by interface 335. Interface 335 can be an example of a memory access interface. Buffer 305 can receive and temporarily store commands from interface 335. For example, firmware component 330 can issue a command to generate a set of cryptographic keys. For example, a host device (e.g., host device 205 as described with reference to FIG. 2) can communicate a write command to a memory device (e.g., memory sub-system 210 as described with reference to FIG. 2) including key manager 325. Firmware component 330 can issue the command to generate the set of cryptographic keys to encrypt the data (and subsequently decrypt the encrypted data) associated with the write command. Interface 335 can communicate the command to generate the cryptographic keys to key manager 325 by buffer 305. Control logic 315 can detect the command and indicate the command to random data generator 320.

Random data generator 320 can be a random number generator that generates random numbers to be used as cryptographic keys or as part of generating cryptographic keys. For example, if random data generator 320 receives a command (e.g., by control logic 315) to generate a pair of cryptographic keys, random data generator 320 can generate a first random number for an encryption key and a corresponding number for a decryption key. The random data generator 320 can communicate encryption keys to volatile memory device 345-a and decryption keys to volatile memory device 345-b. That is, volatile memory device 345-*a* can store cryptographic keys for encrypting data and volatile memory device 345-*b* can store cryptographic keys for decrypting data.

Random data generator 320 can communicate the cryptographic keys by logic components 340. Logic components 340 can be multiplexers configured to select which input (e.g., from random data generator 320 or decrypt engine 365) to output to volatile memory devices 345. Control logic 315 can control which output (e.g., from random data generator 320 or decrypt engine 365) to propagate to volatile memory devices 345. In a case that random data generator 320 is generating cryptographic keys, logic components 340 can output the cryptographic keys from random data generator 320 (e.g., instead of from decrypt engine 365). For example, logic component 340-*a* can propagate the encryption key generated by random data generator 320 to be stored at volatile memory device 345-*a* and logic component 340-*b* can propagate the decryption key generated by random data generator 320 to be stored at volatile memory device 345-*b*.

Key manager 325 can supply the cryptographic keys to a data manager (e.g., data manager 220-*a* as described with reference to FIG. 2). For example, the data manager can request an encryption key (e.g., for a write operation) or a decryption key (e.g., for a read operation). Key manager 325 can supply, to the data manager, the requested encryption key from volatile memory device 345-*a* or the requested decryption key from volatile memory device 345-*b* based on receiving the request.

The volatile memory devices 345 can be static random access memory (SRAM) memory devices. That is, the volatile memory devices 345 can store data while connected to a power source. However, if the volatile memory devices 345 are disconnected from the power source, the volatile memory devices 345 can lose the values of stored data. In some cases, data stored at volatile memory devices 345 can be protected by error correction codes (ECCs). In this case, error correction information associated with the cryptographic keys can be generated prior to storing the cryptographic keys at volatile memory devices 345. Further, the error correction information can be stored at the volatile memory devices 345 along with the cryptographic keys. In some cases, the error correction information and the cryptographic keys can be stored at a same portion of the volatile memory devices 345. Additionally or alternatively, the error correction information can be stored at a different portion within volatile memory devices 345 than the cryptographic keys.

Volatile memory devices 345 can output the cryptographic keys to encrypt engine 350. In some cases, volatile memory devices 345 can output the cryptographic keys to be stored at a nonvolatile memory (e.g., external to key manager 325). In some cases, prior to communicating the cryptographic keys to encrypt engine 350, error correction engine 370 can perform an error correction operation on the cryptographic keys stored at volatile memory devices 345 to detect and/or correct errors within the cryptographic keys. For example, volatile memory devices 345 can communicate the cryptographic keys and associated error correction information to error correction engine 370. Error correction engine 370 can correct errors detected within the cryptographic keys and write the corrected cryptographic keys back to volatile memory devices 345. In some cases, error correction engine 370 can indicate (e.g., to control logic 315) if a number of errors detected in a cryptographic key satisfies a threshold number of errors. The threshold number of errors can correspond to a number of errors able to be corrected by error correction engine 370. If error correction engine 370 detects errors not able to be corrected, error correction engine 370 can indicate that the number of errors satisfied the threshold to control logic 315.

Encrypt engine 350 can encrypt the cryptographic keys received from volatile memory devices 345. The encryption engine can encrypt the cryptographic keys using a second cryptographic key (e.g., a public key). The second cryptographic key can be stored at registers 310. Here, the encrypt engine 350 can receive the second cryptographic key from registers 310. The encrypt engine 350 can further use an initialization vector to encrypt the cryptographic keys. The encrypt engine 350 can generate the initialization vector based on the cryptographic keys and encrypt the cryptographic keys using the initialization vector and the second cryptographic key. The encrypt engine 350 can communicate the encrypted cryptographic keys to error correction encoder 355.

Error correction encoder 355 can perform an error correction operation to generate error correction information associated with the encrypted cryptographic keys. Error correction encoder 355 can communicate the encrypted cryptographic keys and associated error correction information to buffer 305. Buffer 305 can temporarily store the encrypted cryptographic keys and associated error correction information prior to the cryptographic keys and error correction information being communicated to interface 335. Interface 335 can communicate the encrypted cryptographic keys and associated error correction information to firmware component 330. Firmware component 330 can communicate the encrypted cryptographic keys and error correction information to a nonvolatile memory device (e.g., external to key manager 325, external to a memory device).

When key manager 325 is reconnected to a power source (e.g., after being powered off), key manager 325 can load the encrypted cryptographic keys from the nonvolatile memory device. Firmware component 330 can communicate the second cryptographic key (e.g., a public key), the encrypted cryptographic keys, and error correction information associated with the encrypted cryptographic keys to interface 335. Interface 335 can communicate the second cryptographic key (e.g., a public key) to registers 310. Interface 335 can communicate the encrypted cryptographic keys and error correction information associated with the encrypted cryptographic keys to buffer 305. Buffer 305 can communicate the encrypted cryptographic keys, and error correction information associated with the encrypted cryptographic keys to error correction decoder 360. Error correction decoder 360 can perform an error correction operation on the encrypted cryptographic to detect and/or correct errors within the cryptographic keys using the error correction information. Error correction decoder 360 can correct errors detected within the encrypted cryptographic keys and communicate the corrected encrypted keys to decrypt engine 365. In some cases, error correction decoder 360 can indicate (e.g., to control logic 315) if a number of errors detected in an encrypted cryptographic key satisfies a threshold number of errors. The threshold number of errors can correspond to a number of errors able to be corrected by error correction decoder 360. If error correction decoder 360 detects errors not able to be corrected, error correction decoder 360 can indicate that the number of errors satisfied the threshold to control logic 315.

Decrypt engine 365 can receive the second cryptographic key (e.g., from registers 310) and generate the initialization vector associated with the encrypted cryptographic keys. Decrypt engine 365 can decrypt the encrypted cryptographic keys using the second cryptographic key and the initialization vector. Decrypt engine 365 can communicate the cryptographic keys (e.g., the decrypted cryptographic keys) to volatile memory devices 345 by logic components 340. For example, decrypt engine 365 can communicate an encryption key (e.g., by logic component 340-a) to volatile memory device 345-a and communicate a decryption key by logic component 340-b to volatile memory device 345-b. In some cases, control logic 315 can indicate to logic components 340 to propagate the cryptographic keys from decrypt engine 365 to volatile memory devices 345. In some cases, the cryptographic keys can be protected by ECCs. Here, error correction information associated with the cryptographic keys can be generated prior to storing the cryptographic keys at volatile memory devices 345 (e.g., by error correction engine 370).

In some cases, firmware component 330 can indicate to key manager 325 to update one or more cryptographic keys. For example, in a case that error correction engine 370 or decrypt engine 365 indicates (e.g., to control logic 315) that the number of detected errors satisfies a threshold, control logic 315 can propagate the indication to firmware component 330. Here, firmware component 330 can generate a command to erase the previous cryptographic key and generate a new cryptographic key. Firmware component 330 can communicate the commands to key manager 325. Control logic 315 can receive the commands (e.g., by buffer 305 and interface 335) and indicate to random data generator 320 to generate a new cryptographic key. Random data generator 320 can generate a new cryptographic key based on receiving the indication from control logic 315. In some cases, random data generator 320 can compare the new cryptographic key to the previous cryptographic key to determine that the randomly generated new cryptographic key is different than the previous cryptographic key. If the new cryptographic key and the previous cryptographic key are the same, random data generator 320 can generate a second new cryptographic key. Random data generator 320 can communicate the new cryptographic keys to volatile memory devices 345. Key manager 325 can also encrypt the new cryptographic keys and communicate the encrypted new cryptographic keys to firmware component 330 for storage at the nonvolatile memory device.

Figure 4:
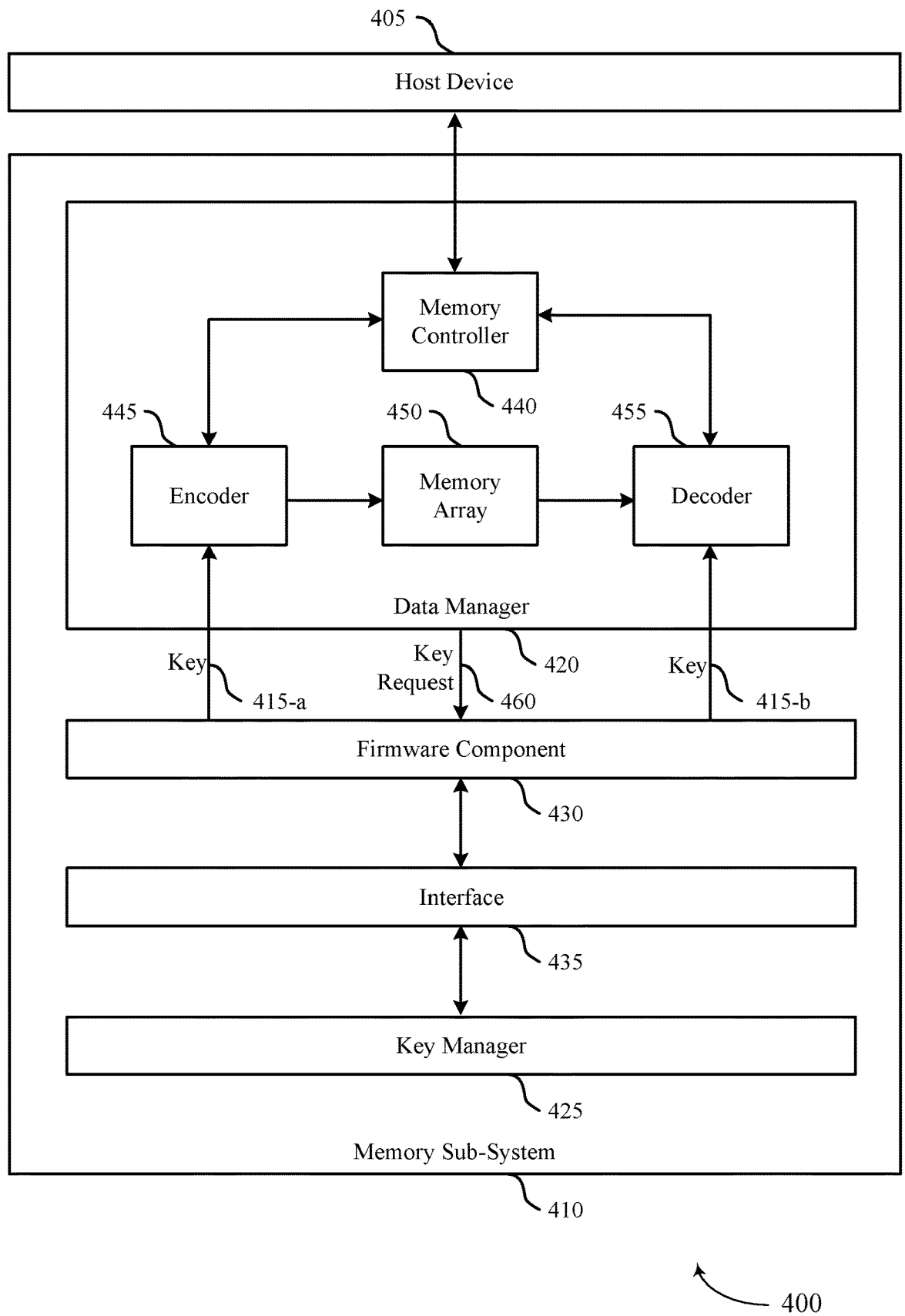

FIG. 4 illustrates an example of a system 400 that supports cryptographic key management in accordance with some embodiments of the present disclosure. System 400 can include one or more components described herein with reference to FIGS. 1 through 3, among others. For example, the system 400 can include host device 405, which can be an example of host system 105 or host device 205 as described with reference to FIGS. 1 and 2; memory sub-system 410 which can be an example of a memory sub-system 110 or memory sub-system 210 as described with reference to FIGS. 1 and 2; data manager 420, which can be an example of data manager 220 as described with reference to FIG. 2; memory controller 440, which can be an example of a memory sub-system controller 115 or local media controller 135 as described with reference to FIG. 1; key manager 425, which can be an example of the key manager 150, 225, or 325 as described with reference to FIGS. 1 through 3; interface 435, which can be an example of the interfaces 235 or 335 as described with reference to FIGS. 2 and 3; and firmware component 430, which can be an example of firmware components 230 or 330 as described with reference to FIGS. 2 and 3. The system 400 can further include a memory array 450, an encoder 445, and a decoder 455.

A data path refers to the logical course or path that user data and metadata follow as they move throughout the memory sub-system. The data path in the memory sub-system handles read and write data commands received from the host system. The data path encompasses the complete, end-to-end course taken by data as it is either written to or read from the underlying memory devices. A control path refers to the logical course or path that provides different control signals, for example, to components on the data path to control how the data path works properly. The control path and data path include digital circuitry, registers, and interconnecting buses.

Memory sub-system 410 (e.g., a memory device) can receive an access command from host device 405. Data manager 420 can manage the execution of the access command. That is, the data manager can manage the data path (e.g., of data written to and read from the memory device). For example, memory sub-system 410 can receive a write command from host device 405 to write data to memory array 450. In another example, memory sub-system 410 can receive a read command from host device 405 to read data from memory array 450 and communicate the data to host device 405. Memory sub-system 410 can encrypt data stored at memory array 450 to increase the security associated with the data.

During a write operation, memory controller 440 can receive the write command and data to be written to memory array 450. In order to encrypt the data to be written to memory array 450, memory sub-system 410 can request an encryption key from key manager 425. Memory sub-system 410 can communicate a key request 460 to firmware component 430. The key request can request a cryptographic key for encrypting the data (e.g., an encryption key) prior to writing the data to memory array 450. Firmware component 430 can propagate key request 460 by interface 435 to key manager 425. Key manager 425 can supply the cryptographic key (e.g., an encryption key) based on receiving key request 460. In some cases, key manager 425 can generate a new key based on key request 460. For example, firmware component 430 can determine key manager 425 is not storing the cryptographic key for encrypting the data. Therefore, firmware component 430 can generate a command for key manager 425, the command for generating the cryptographic key. In some other cases, key manager 425 can be storing the cryptographic key and the firmware component 430 can indicate key request 460 to key manager 425.

Key manager 425 can communicate the requested key 415-a (or, in some cases, the newly generate cryptographic key) to encoder 445 by interface 435 and firmware component 430. In some cases, key manager 425 can further communicate an initialization vector associated with the key 415-a. Encoder 445 can encrypt the data to be stored at memory array 450 using the key 415-a (e.g., an encryption key) and the initialization vector. Encoder 445 can communicate the encrypted data to the memory array 450. Memory controller 440 can facilitate writing the encrypted data to memory array 450 according to the write command.

During a read operation, memory controller 440 can receive a read command from host device 405. In order to use the data, memory sub-system 410 can decrypt the data stored at memory array 450. Memory sub-system 410 can request a decryption key from key manager 425 by communicating a key request 460 to firmware component 430. Firmware component 430 can propagate key request 460, by interface 435, to key manager 425. Key manager 425 can supply the requested key 415-b to decoder 455. Key manager 425 can further supply an initialization vector associated with the key 415-*b* to decoder 455. Decoder 455 can receive the data (e.g., associated with the read command) and decrypt the data using the initialization vector and the key 415-*b*. Decoder 455 can communicate the decrypted data to memory controller 440, which in turn can communicate the decrypted data to host device 405 according to the read command.

Figure 5:
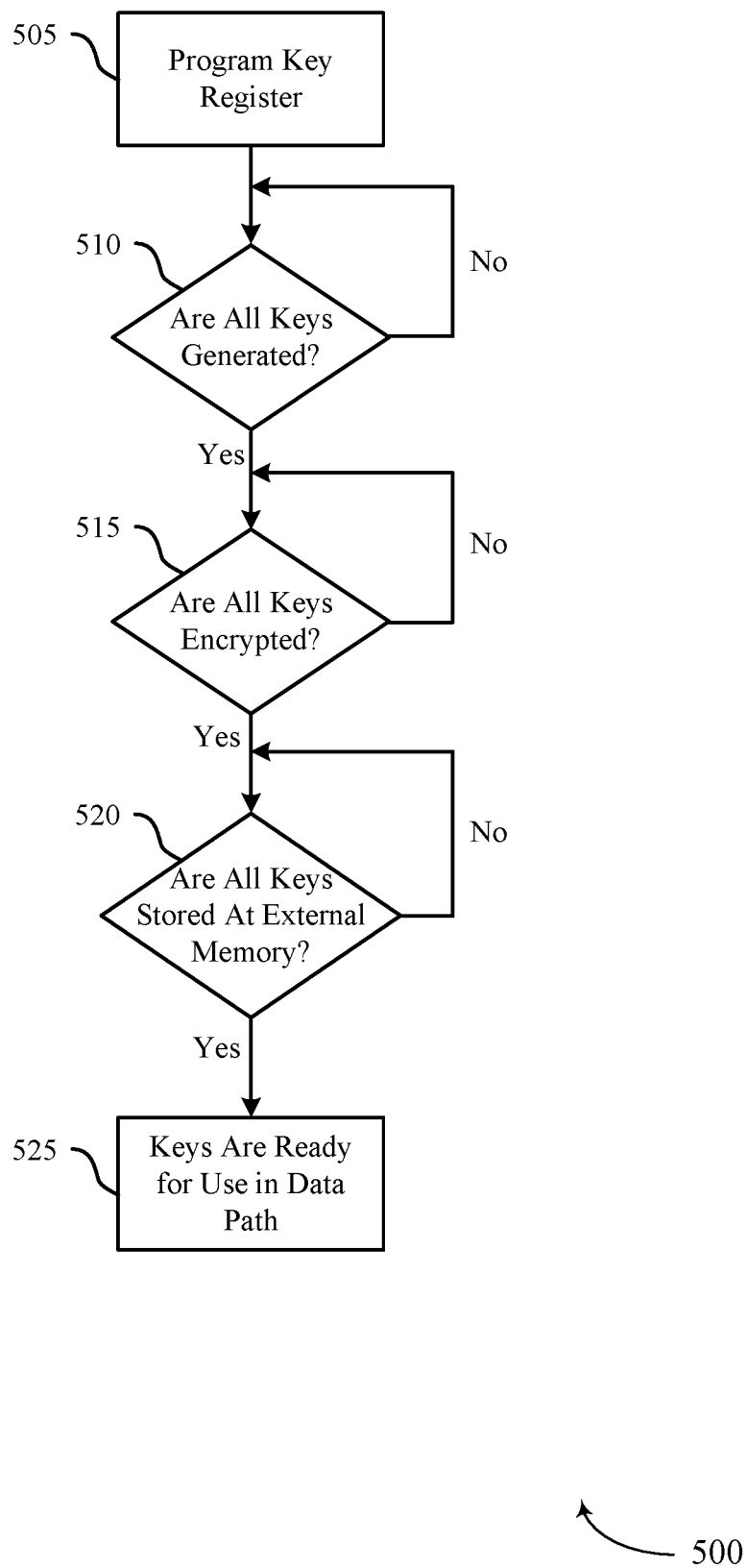
FIGS. 5 and 6 illustrate example methods that support cryptographic key management in accordance with some embodiments of the present disclosure.

FIG. 5 illustrates an example of a method 500 The method 500 can be performed by processing logic that can include hardware (e.g., processing device, digital circuitry, dedicated logic, programmable logic, microcode, hardware of a device, integrated circuit, etc.), software (e.g., instructions run or executed on a processing device), or a combination of such. In some embodiments, the method 500 is performed by the key manager of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 505, the key manager can program the key register. In some cases, the key manager can program the key register based on a command to generate one or more cryptographic keys. For example, a firmware component can issue a command to the key manager (e.g., from a firmware component) to generate one or more cryptographic keys. In some cases, the firmware component can issue the command based on initializing the memory sub-system. Additionally or alternatively, the firmware component can issue the command based on the memory sub-system receiving a write command from a host device. The command can indicate to the key manager to generate a certain number of cryptographic keys. The key register can be an example of registers at the key manager (e.g., registers 310 as described with reference to FIG. 3). The key manager can program the key register to include the second cryptographic key (e.g., the public key). In some cases, the key manager can receive the second cryptographic key from the firmware component.

At 510, the key manager can determine if each of the keys has been generated. For example, if the command (e.g., issued by the firmware component) indicated for the key manager to generate 100 cryptographic keys, the key manager can determine whether the 100 keys have been generated. If all of the cryptographic keys have not been generated, the key manager can generate a key (e.g., by a random number generator) and proceed back to 510. If all of the cryptographic keys have been generated, the key manager can proceed to 515.

At 515, the key manager can determine if each of the keys are encrypted. That is, each of the generated cryptographic keys can be encrypted using the second cryptographic key (e.g., stored at the key register) and an initialization vector. Encrypting the cryptographic keys can increase the security of the memory sub-system. If all of the cryptographic keys are not encrypted, the key manager can encrypt one of the generated keys (e.g., at encrypt engine 350 as described with reference to FIG. 3) and proceed back to 515. Alternatively, if all of the cryptographic keys have been encrypted, the key manager can proceed to 520.

At 520, the memory sub-system, such as a memory sub-system controller, can determine if all keys are stored at a memory device (e.g., a nonvolatile memory device external to a key manager of the memory sub-system controller). That is, the key manager can store the cryptographic keys (e.g., not encrypted cryptographic keys) at a volatile memory device of the key manager. However, the volatile memory device cannot retain the cryptographic keys if the volatile memory device is disconnected from a power source. Therefore, the key manager can communicate the encrypted cryptographic keys to a firmware component. The firmware component can store the encrypted cryptographic keys at a nonvolatile memory device. If all of the encrypted cryptographic keys are not stored at the nonvolatile memory, the key manager can store an encrypted cryptographic key at the nonvolatile memory and proceed back to 520. Alternatively, if all of the encrypted cryptographic keys are stored at the nonvolatile memory, the memory sub-system can proceed to 525.

At 525, the cryptographic keys can be available for use within the data path. That is, if the memory sub-system receives an access command from a host device, the key manager can supply a cryptographic key (e.g., an encryption key, a decryption key) to the data manager (e.g., as described with reference to FIGS. 2 and 3).

Figure 6:
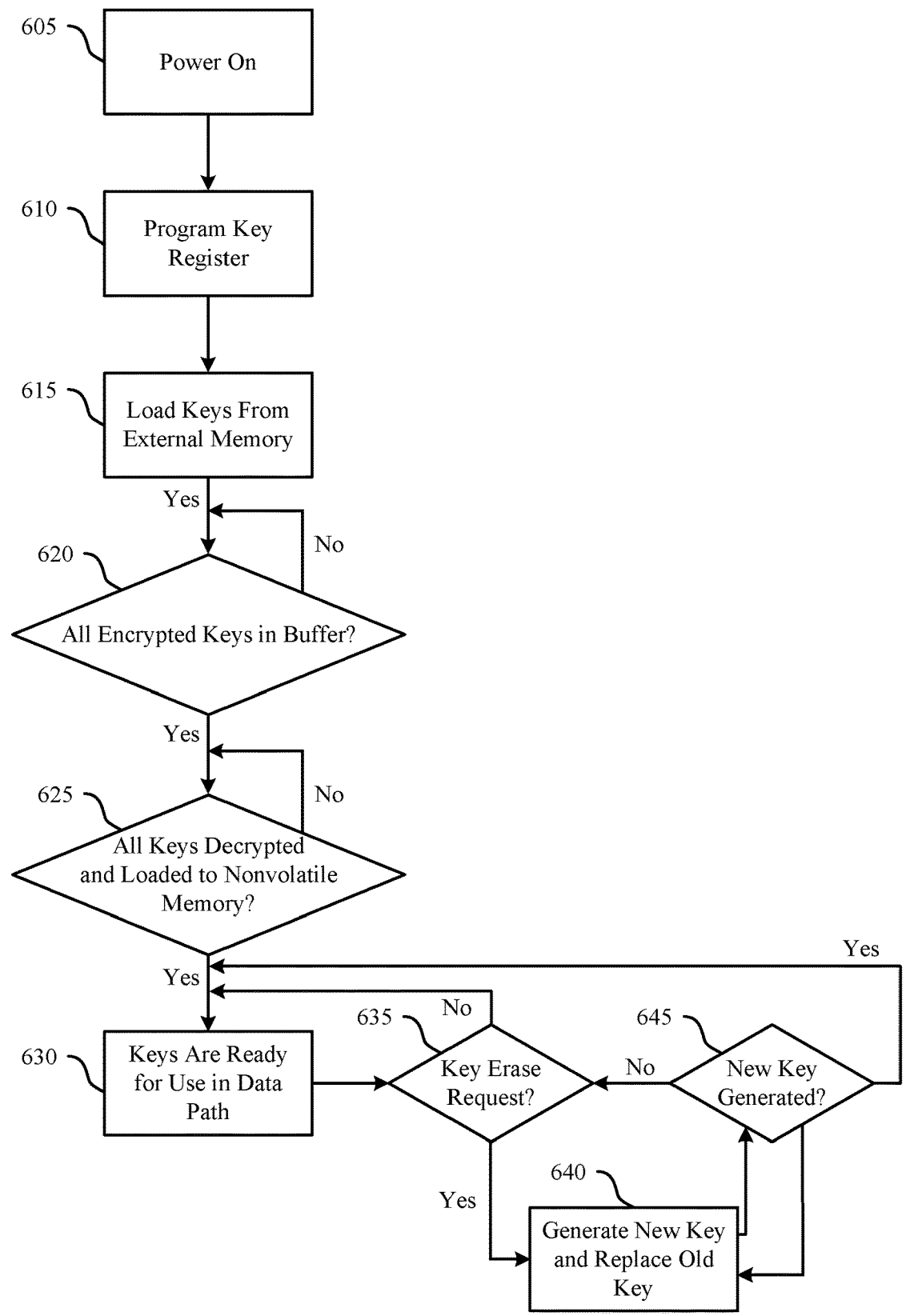

FIG. 6 illustrates an example of a method 600 The method 600 can be performed by processing logic that can include hardware (e.g., processing device, digital circuitry, dedicated logic, programmable logic, microcode, hardware of a device, integrated circuit, etc.), software (e.g., instructions run or executed on a processing device), or a combination of such. In some embodiments, the method 600 is performed by the key manager 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 605, the key manager can be powered on. In some cases, the key manager can have been previously disconnected from a power source. For example, the memory sub-system can have been powered off.

At 610, the key manager can program the key register. The key register can be an example of registers at the key manager (e.g., registers 310 as described with reference to FIG. 3). The key manager can program the key register to include the second cryptographic key (e.g., the public key). In some cases, the key manager can receive the second cryptographic key from the firmware component.

At 615, the key manager can load the keys from an external memory (e.g., a nonvolatile memory device external to the key manager). For example, the key manager can load the keys from a nonvolatile memory device external to the key manager. In some cases, the nonvolatile memory device can be external to the memory sub-system controller. The key manager can receive encrypted cryptographic keys by the firmware component. In some cases, the firmware component can communicate the encrypted cryptographic keys (from the nonvolatile memory device) to a buffer at the key manager (e.g., buffer 305 as described with reference to FIG. 3).

At 620, the key manager can determine if each of the encrypted keys is in the buffer (e.g., loaded from the nonvolatile memory device). If each of the encrypted cryptographic keys are not in the buffer, the firmware component can load an additional cryptographic key into the buffer and proceed back to 620. Alternatively, if each of the encrypted cryptographic keys are in the buffer, the firmware component can proceed to 625.

At 625, the key manager can determine if each of the decrypted cryptographic keys is loaded to volatile memory. That is, the key manager can receive the encrypted cryptographic keys and decrypt each of the keys (e.g., at decrypt engine 365 as described with reference to FIG. 3) using the second cryptographic key and an initialization vector (e.g., associated with the cryptographic key). The decrypted keys can then be stored at a volatile memory device at the key manager (e.g., volatile memory devices 345 as described with reference to FIG. 3). If the key manager determines that each of the keys are not decrypted and stored in the volatile memory at 625, the key manager can decrypt a cryptographic key and store the decrypted cryptographic key at the volatile memory device. The key manager can then proceed back to 625. Alternatively, if the key manager determines that each of the decrypted cryptographic keys are stored at the volatile memory device, the key manager can proceed to 630.

At 630, the cryptographic keys can be available for use within the data path. That is, if the memory sub-system receives an access command from a host device, the key manager can supply a cryptographic key (e.g., an encryption key, a decryption key) to the data manager (e.g., as described with reference to FIGS. 2 and 3).

At 635, the key manager can determine if there is a key erase request. That is, the firmware component can generate a key erase request to update a cryptographic key (e.g., generate a new cryptographic key to replace the old cryptographic key). In some cases, the firmware component can generate the key erase request in an event that an error correction component at the key manager (e.g., error correction engine 370, decrypt engine 365) detects more than a threshold number of errors. For example, the error correction component can be able to correct a certain number of errors within the cryptographic keys. However, the number of errors within the cryptographic key can exceed that number. The error correction component can signal (e.g., to control logic 315 as described with reference to FIG. 3) that the number of errors satisfies the threshold. This can cause the firmware component to generate the key erase request and generate a new cryptographic key. If the key manager determines that there is no key erase request, the key manager can proceed to 630. Alternatively, the key manager can proceed to 640.

At 640, the key manager can generate a new cryptographic key. The key manager can store the new cryptographic key at the volatile memory device at the key manager. The key manager can then proceed to 645.

At 645, the key manager can determine whether the new cryptographic key has been generated in response to the key erase request. If the new cryptographic key has been generated, the key manager can proceed to 630. Alternatively, the key manager can proceed to 640. The key manager can encrypt the new cryptographic key (e.g., by using the encrypt engine 350 as described with reference to FIG. 3) and generate error correction information associated with the encrypted new cryptographic key. The encrypted new cryptographic key and the corresponding error correction information can be communicated to a buffer (e.g., buffer 305 as described with reference to FIG. 3). The key manager can communicate to the encrypted new cryptographic key to a firmware component (e.g., firmware component 330 as described with reference to FIG. 3). The firmware component can load the encrypted new cryptographic key and associated error correction information to an external non-volatile memory device.

Figure 7:
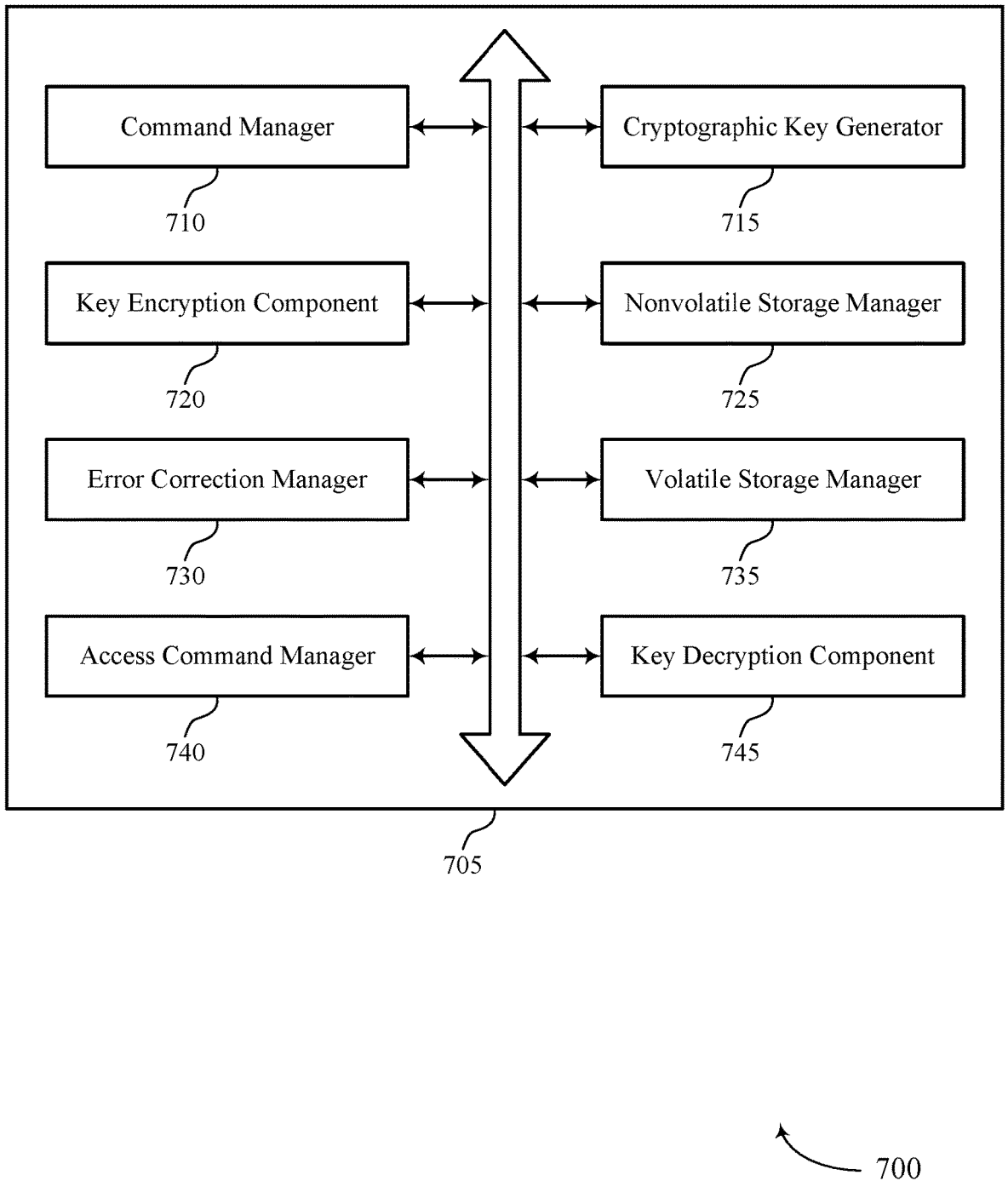
FIG. 7 illustrates a block diagram of a memory sub-system that supports cryptographic key management in accordance with some embodiments of the present disclosure.

FIG. 7 illustrates a block diagram 700 of a memory sub-system 705 that supports cryptographic key management in accordance with some embodiments of the present disclosure. The memory sub-system 705 can be an example of aspects of a memory sub-system described with reference to FIGS. 1, 2, and 4. The memory sub-system 705 can include a command manager 710, a cryptographic key generator 715, a key encryption component 720, a nonvolatile storage manager 725, an error correction manager 730, a volatile storage manager 735, an access command manager 740, and a key decryption component 745. Each of these modules can communicate, directly or indirectly, with one another (e.g., via one or more buses).

The command manager 710 can issue, by a firmware component, a command to generate a first cryptographic key for encrypting or decrypting user data stored on a memory device. The command manager 710 can additionally receive (e.g., by a hardware component) the command to generate the first cryptographic key for encrypting or decrypting user data stored on the memory device.

In some examples, the command manager 710 can issue, by the firmware component, a second command to generate an updated first cryptographic key for encrypting or decrypting the user data stored on the memory device. In some cases, the command manager 710 can receive, by the hardware component, the second command to generate the updated first cryptographic key for encrypting or decrypting the user data stored on the memory device. Additionally or alternatively, the command manager 710 can issue, by the firmware component, a second command to generate a third cryptographic key for encrypting or decrypting second user data stored on the memory device. In some examples, the command manager 710 can issue, by the firmware component, a command to update the first cryptographic key.

The cryptographic key generator 715 can generate, by the hardware component, the first cryptographic key based on the command. In some examples, the cryptographic key generator 715 can generate, by the hardware component, the updated first cryptographic key based on the issuing the second command. For example, if the second command indicates to the hardware component to generate the updated first cryptographic key, the cryptographic key generator 715 can generate the updated first cryptographic key based on the issuing the second command.

In some cases, generating the updated cryptographic key can include the cryptographic key generator 715 generating a first set of random data. Here, the cryptographic key generator 715 can determine that the first set of random data and the first cryptographic key include a same set of data. In some examples, the cryptographic key generator 715 can generate a second set of random data based on the determining that the first set of random data and the first cryptographic key include the same set of data. The cryptographic key generator 715 can determine that the second set of random data and the first cryptographic key include a different set of data, where the updated first cryptographic key includes the second set of random data based on the determining that the second set of random data and the first cryptographic key include the different set of data.

In some examples, the cryptographic key generator 715 can generate, by the hardware component, a third cryptographic key associated with the first cryptographic key, where one of the first cryptographic key or the third cryptographic key is for encrypting the user data and the other of the first cryptographic key or the third cryptographic key is for decrypting the user data. In some cases, the cryptographic key generator 715 can generate, by the hardware component, the third cryptographic key based on the issuing the second command.

The key encryption component 720 can encrypt, by the hardware component, the first cryptographic key using a second cryptographic key and an initialization vector. In some examples, the key encryption component 720 can encrypt, by the hardware component, the updated first cryptographic key using the second cryptographic key and the initialization vector. In some instances, the key encryption component 720 can encrypt, by the hardware component, the third cryptographic key using the second cryptographic key and a second initialization vector. In some cases, the initialization vector is based on the user data stored on the memory device.

The nonvolatile storage manager 725 can communicate (e.g., from the hardware component) the encrypted first cryptographic key to a nonvolatile memory device for storage, the nonvolatile memory device separate from the hardware component. In some cases, the nonvolatile storage manager 725 can store the encrypted first cryptographic key in the nonvolatile memory device separate from the hardware component. In some examples, the nonvolatile storage manager 725 can receive, by a firmware component from a nonvolatile memory device or by a hardware component from the nonvolatile memory device (e.g., by the firmware component), an encrypted first cryptographic key and a second cryptographic key, where the encrypted first cryptographic key is for encrypting or decrypting user data stored on a memory device. In some examples, the nonvolatile storage manager 725 can receive, by the firmware component from the nonvolatile memory device, error correction information associated with the encrypted first cryptographic key. In some instances, the nonvolatile storage manager 725 can communicate the error correction information to the nonvolatile memory device for storage based on communicating the encrypted first cryptographic key to the nonvolatile memory device for storage. In some cases, the nonvolatile storage manager 725 can store the error correction information in the nonvolatile memory device based on storing the encrypted first cryptographic key in the nonvolatile memory device.

In some examples, the nonvolatile storage manager 725 can retrieve (e.g., by the firmware component) the encrypted first cryptographic key from the nonvolatile memory device. In some instances, the nonvolatile storage manager 725 can receive, by the hardware component, the encrypted first cryptographic key from the nonvolatile memory device (e.g., by the firmware component). In some cases, the nonvolatile storage manager 725 can retrieve, by the firmware component, error correction information associated with the encrypted first cryptographic key from the nonvolatile memory device. In some examples, the nonvolatile storage manager 725 can receive, by the hardware component, the encrypted first cryptographic key from the nonvolatile memory device (e.g., by the firmware component).

The error correction manager 730 can generate, by the hardware component, error correction information for the encrypted first cryptographic key. In some examples, the error correction manager 730 can perform an error correction operation on the first cryptographic key stored in the first volatile memory device based on retrieving the encrypted first cryptographic key. In some cases, the error correction manager 730 can perform, by the hardware component, an error correction operation on the encrypted first cryptographic key based on the retrieving the error correction information. For example, the error correction manager 730 can perform the error correction operation on the encrypted first cryptographic key using the error correction information. In some cases, decrypting the encrypted first cryptographic key is based on the performing the error correction operation.

In some instances, the error correction manager 730 can detect or determine (e.g., by the hardware component) that a quantity of errors within the encrypted first cryptographic key satisfies a threshold of errors, where the issuing the second command is based on detecting that the quantity of errors within the encrypted first cryptographic key satisfies the threshold of errors.

The volatile storage manager 735 can store the first cryptographic key in a volatile memory device on the hardware component based on decrypting the encrypted first cryptographic key. In some cases, the volatile storage manager 735 can store the first cryptographic key in a first volatile memory device of the hardware component, where the first cryptographic key includes an encryption key for encrypting the user data. In some examples, the volatile storage manager 735 can store a third cryptographic key in a second volatile memory device of the hardware component, where the third cryptographic key includes a decryption key for decrypting the user data.

The access command manager 740 can receive, from a host device, an access command associated with the user data stored on the memory sub-system. In some examples, the access command manager 740 can encrypt or decrypt the user data using the first cryptographic key and the initialization vector based on the receiving the access command.

The key decryption component 745 can decrypt, by a hardware component, the encrypted first cryptographic key using the second cryptographic key and an initialization vector.

Figure 8:
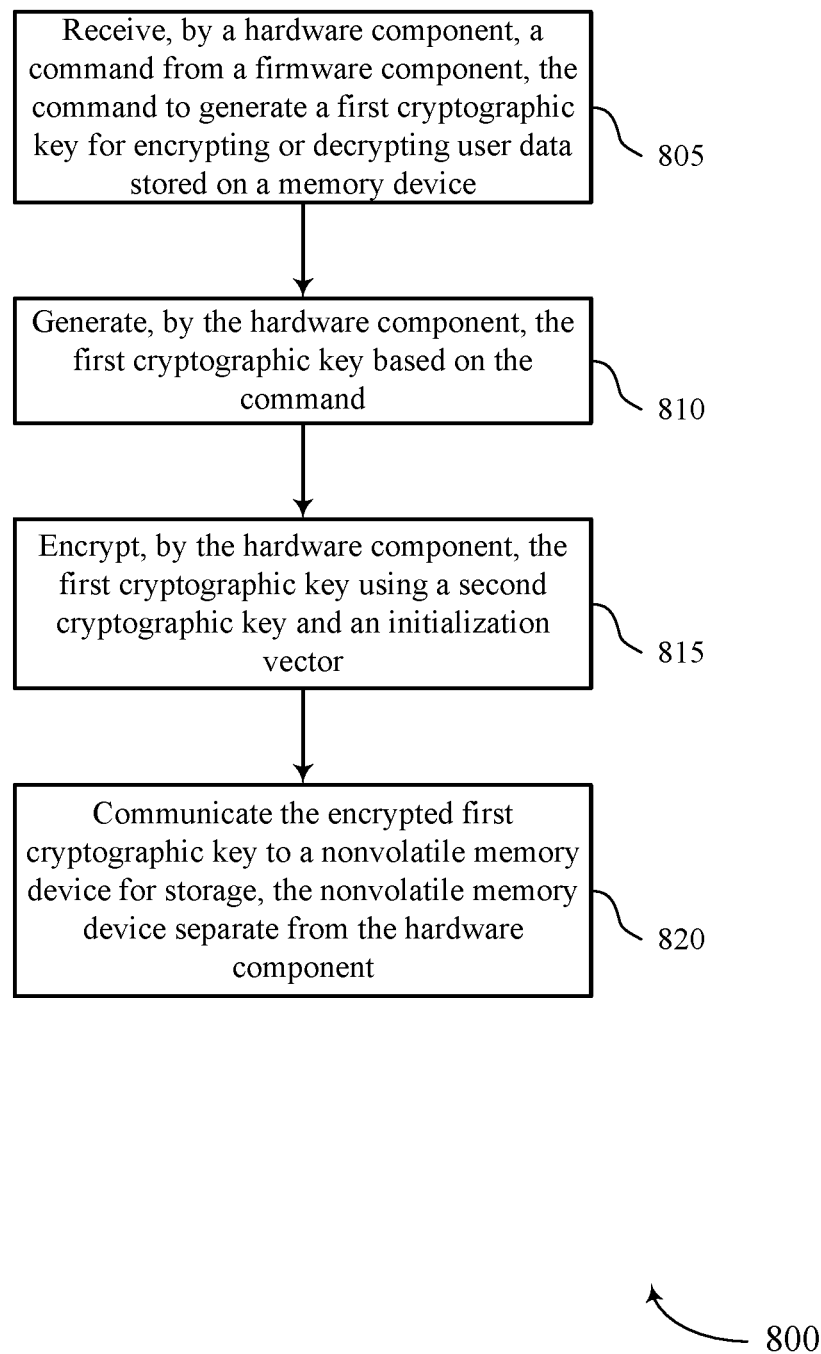
FIGS. 8 through 11 illustrate flowcharts illustrating a method or methods that support cryptographic key management in accordance with some embodiments of the present disclosure.

FIG. 8 illustrates a flowchart illustrating a method or methods 800 The method 800 can be performed by processing logic that can include hardware (e.g., processing device, digital circuitry, dedicated logic, programmable logic, microcode, hardware of a device, integrated circuit, etc.), software (e.g., instructions run or executed on a processing device), or a combination of such. In some embodiments, the method 800 is performed by the key manager of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 805, the hardware component of the processing logic can receive (e.g., from a firmware component of the processing logic) a first cryptographic key for encrypting or decrypting user data stored on a memory device.

At 810, the hardware component of the processing logic can generate the first cryptographic key based on the command. The hardware component can include digital circuitry with dedicated (i.e., hard-coded) logic. The hardware can be part of the memory sub-system controller.

At 815, the hardware component of the processing logic can encrypt the first cryptographic key using a second cryptographic key and an initialization vector.

At 820, the hardware component of the processing logic can communicate the encrypted first cryptographic key to a nonvolatile memory device for storage, the nonvolatile memory device separate from the hardware component.

Figure 9:
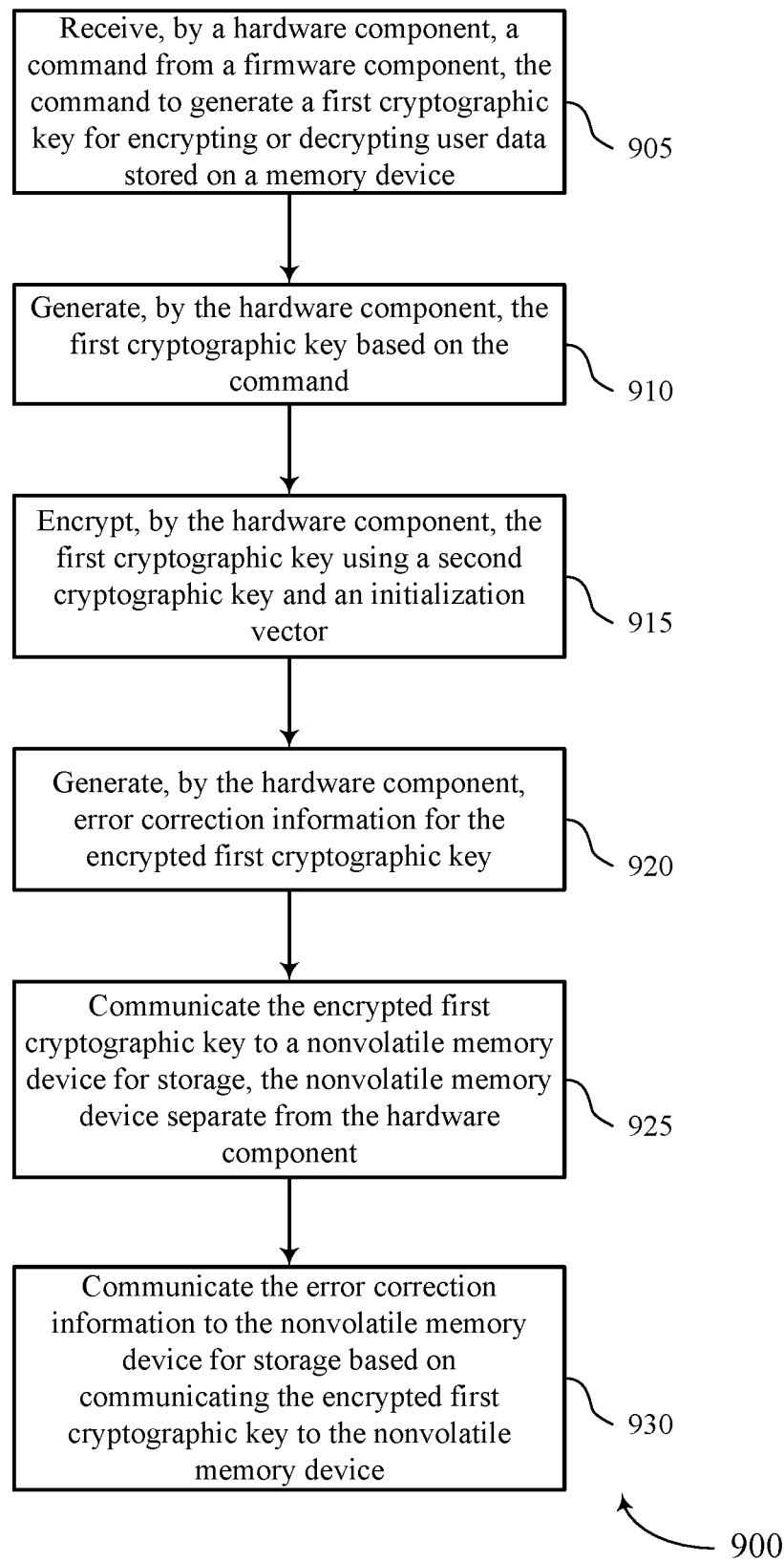

FIG. 9 illustrates a flowchart illustrating a method or methods 900 that supports cryptographic key management in accordance with some embodiments of the present disclosure. The method 900 can be performed by processing logic that can include hardware (e.g., processing device, digital circuitry, dedicated logic, programmable logic, microcode, hardware of a device, integrated circuit, etc.), software (e.g., instructions run or executed on a processing device), or a combination of such. In some embodiments, the method 900 is performed by the key manager of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 905, a hardware component of the processing logic can receive a command from a firmware component of the processing logic, the command to generate a first cryptographic key for encrypting or decrypting user data stored on a memory device.

At 910, the hardware component of the processing logic can generate the first cryptographic key based on the command. The hardware can include digital circuitry with dedicated (i.e., hard-coded) logic. The hardware can be part of the memory sub-system controller.

At 915, the hardware component can encrypt, the first cryptographic key using a second cryptographic key and an initialization vector.

At 920, the hardware component can generate error correction information for the encrypted first cryptographic key.

At 925, the hardware component can communicate the encrypted first cryptographic key to a nonvolatile memory device for storage, the nonvolatile memory device separate from the hardware component.

At 930, the hardware component can communicate the error correction information to the nonvolatile memory device for storage based on communicating the encrypted first cryptographic key to the nonvolatile memory device.

Figure 10:
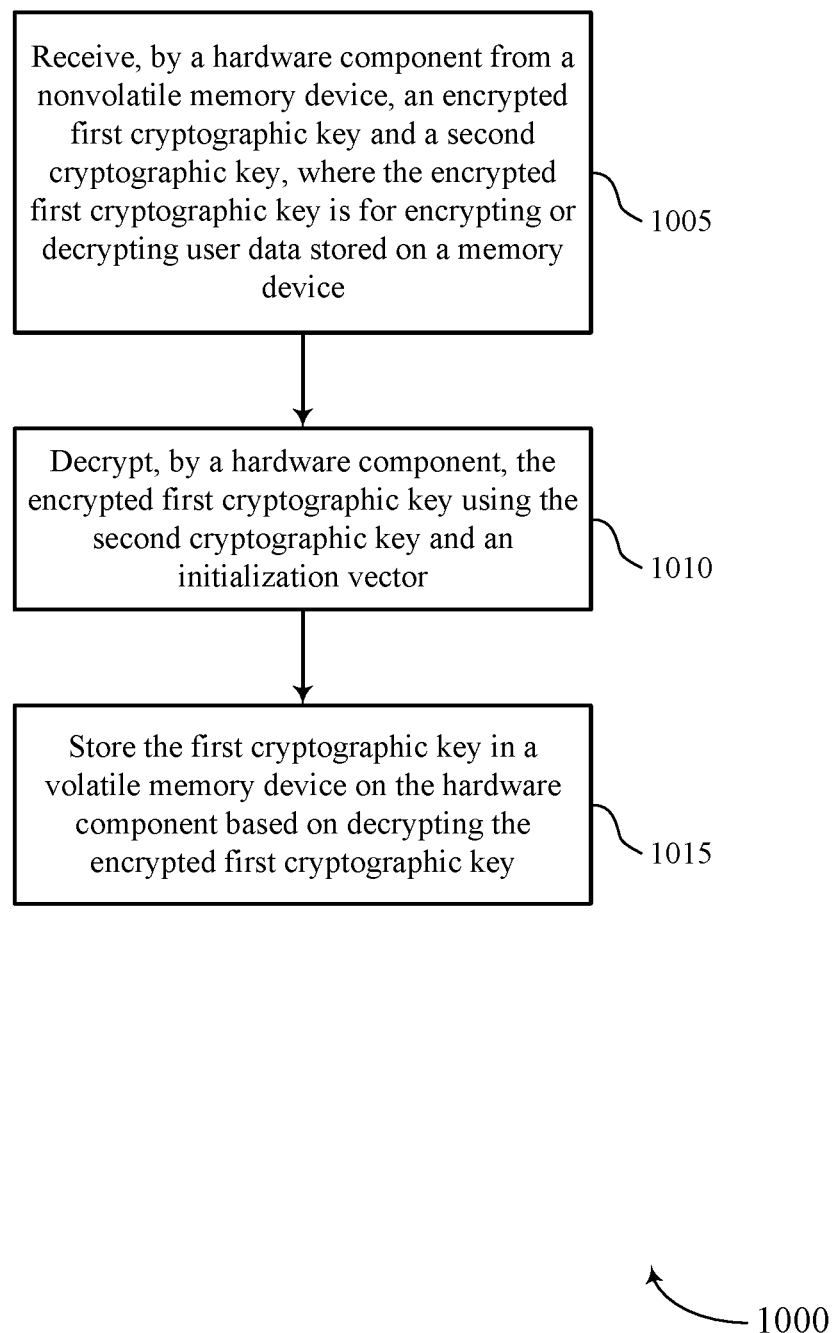

FIG. 10 illustrates a flowchart illustrating a method or methods 1000 that supports cryptographic key management in accordance with some embodiments of the present disclosure. The method 1000 can be performed by processing logic that can include hardware (e.g., processing device, digital circuitry, dedicated logic, programmable logic, microcode, hardware of a device, integrated circuit, etc.), software (e.g., instructions run or executed on a processing device), or a combination of such. In some embodiments, the method 1000 is performed by the key manager of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 1005, a hardware component of the processing logic can receive (e.g., by a firmware component of the processing logic) an encrypted first cryptographic key and a second cryptographic key, where the encrypted first cryptographic key is for encrypting or decrypting user data stored on a memory device.

At 1010, the hardware component of the processing logic can decrypt the encrypted first cryptographic key using the second cryptographic key and an initialization vector. The hardware can include digital circuitry with dedicated (i.e., hard-coded) logic. The hardware can be part of the memory sub-system controller.

At 1015, the processing logic can store the first cryptographic key in a volatile memory device on the hardware component based on decrypting the encrypted first cryptographic key.

Figure 11:
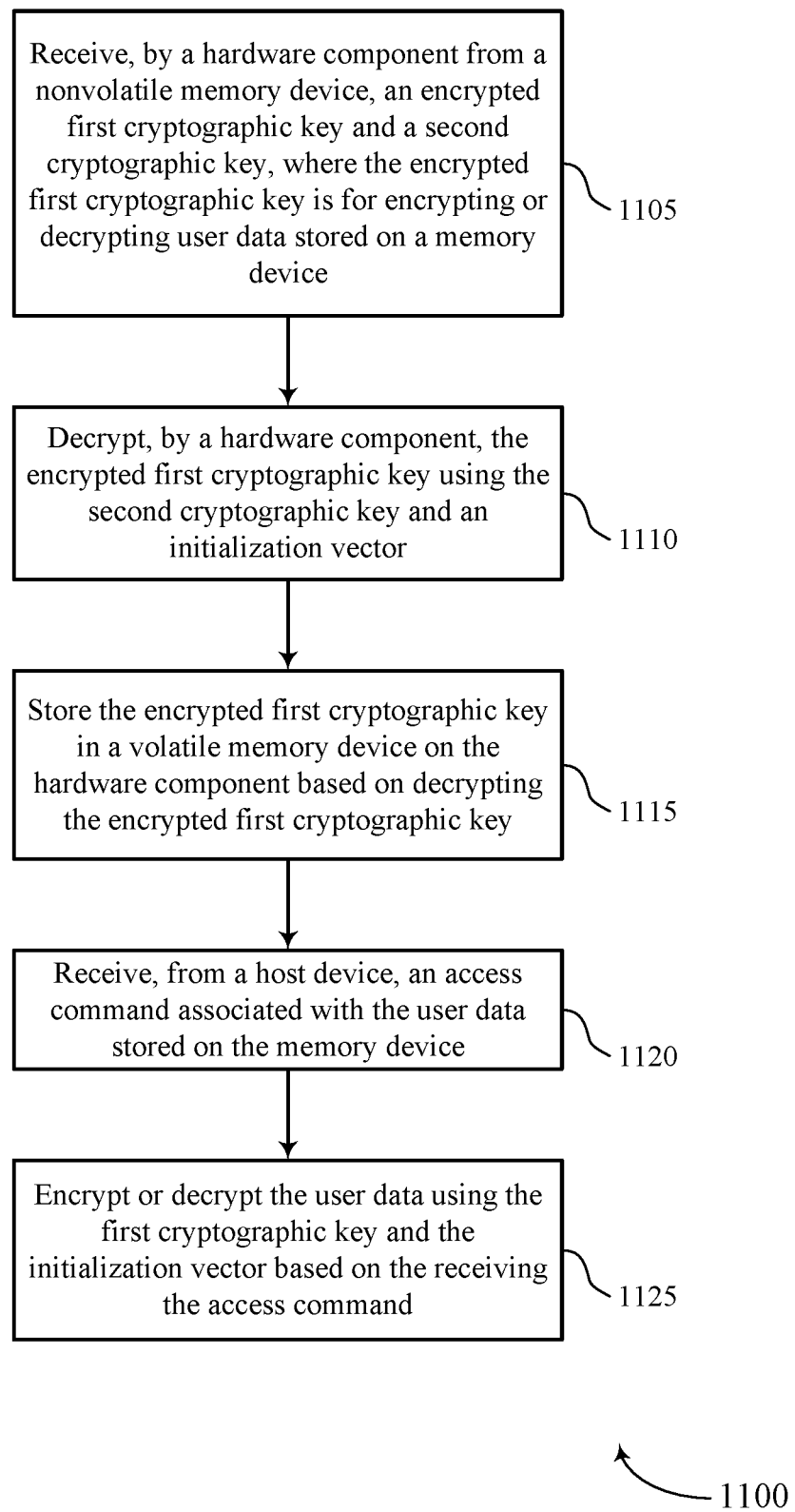

FIG. 11 illustrates a flowchart illustrating a method or methods 1100 that supports cryptographic key management in accordance with some embodiments of the present disclosure. The method 1100 can be performed by processing logic that can include hardware (e.g., processing device, digital circuitry, dedicated logic, programmable logic, microcode, hardware of a device, integrated circuit, etc.), software (e.g., instructions run or executed on a processing device), or a combination of such. In some embodiments, the method 1100 is performed by the key manager of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 1105, the hardware component of the processing logic can receive (e.g., by the firmware component of the processing logic) an encrypted first cryptographic key and a second cryptographic key, where the encrypted first cryptographic key is for encrypting or decrypting user data stored on a memory device.

At 1110, the hardware component of the processing logic can decrypt the encrypted first cryptographic key using the second cryptographic key and an initialization vector. The hardware can include digital circuitry with dedicated (i.e., hard-coded) logic. The hardware can be part of the memory sub-system controller.

At 1115, the hardware component can store the first cryptographic key in a volatile memory device on the hardware component based on decrypting the encrypted first cryptographic key.

At 1120, the processing logic can receive, from a host device, an access command associated with the user data stored on the memory device.

At 1125, the processing logic can encrypt or decrypt the user data using the first cryptographic key and the initialization vector based on the receiving the access command.

It should be noted that the methods described above describe possible implementations, and that the operations and the steps can be rearranged or otherwise modified and that other implementations are possible. Furthermore, portions from two or more of the methods can be combined.

Figure 12:
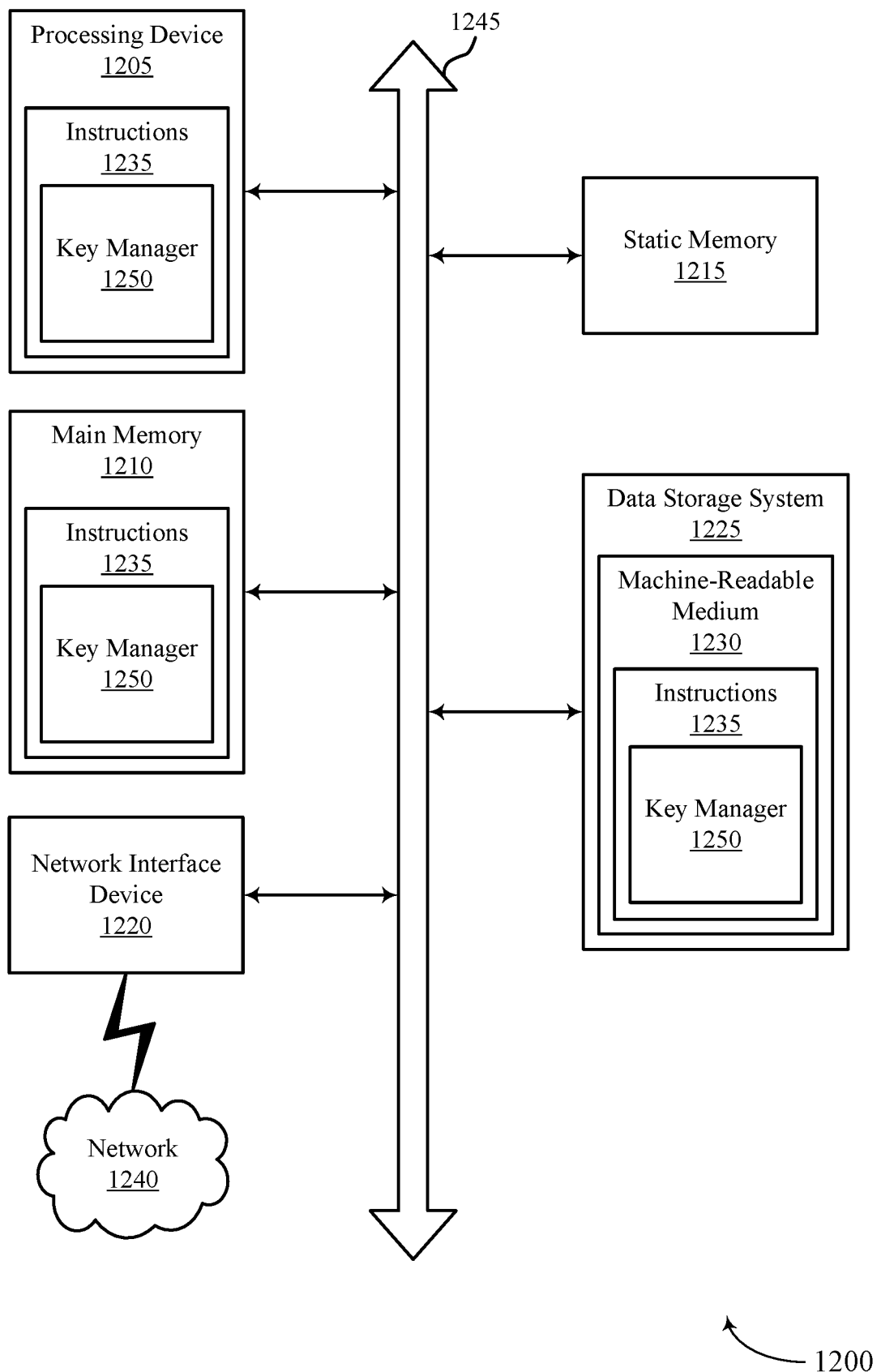
FIG. 12 illustrates an example machine of a computer system that supports cryptographic key management in accordance with some embodiments of the present disclosure.

FIG. 12 illustrates an example machine of a computer system 1200 that supports cryptographic key management in accordance with some embodiments of the present disclosure. The computer system 1200 can include a set of instructions, for causing the machine to perform any one or more of the techniques described herein. In some examples, the computer system 1200 can correspond to a host system (e.g., the host system 105 described with reference to FIG.

1) that includes, is coupled with, or utilizes a memory sub-system (e.g., the memory sub-system 110 described with reference to FIG. 1) or can be used to perform the operations of a controller (e.g., to execute an operating system to perform operations corresponding to the key manager 150 described with reference to FIG. 1). In some examples, the machine can be connected (e.g., networked) with other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 1200 can include a processing device 1205, a main memory 1210 (e.g., ROM, flash memory, DRAM such as SDRAM or RDRAM, etc.), a static memory 1215 (e.g., flash memory, SRAM, etc.), and a data storage system 1225, which communicate with each other via a bus 1245.

Processing device 1205 represents one or more general-purpose processing devices such as a microprocessor, thus a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1205 can also be one or more special-purpose processing devices such as an application specific integrated circuit (ASIC), a field programmable gate array (FPGA), a digital signal processor (DSP), network processor, or the like. The processing device 1205 is configured to execute instructions 1235 for performing the operations and steps discussed herein. The computer system 1200 can further include a network interface device 1220 to communicate over the network 1240.

The data storage system 1225 can include a machine-readable storage medium 1230 (also known as a computer-readable medium) on which is stored one or more sets of instructions 1235 or software embodying any one or more of the methodologies or functions described herein. The instructions 1235 can also reside, completely or at least partially, within the main memory 1210 and/or within the processing device 1205 during execution thereof by the computer system 1200, the main memory 1210 and the processing device 1205 also constituting machine-readable storage media. The machine-readable storage medium 1230, data storage system 1225, and/or main memory 1210 can correspond to a memory sub-system.

In one example, the instructions 1235 include instructions to implement functionality corresponding to a key manager 1250 (e.g., the key manager 150 described with reference to FIG. 1). While the machine-readable storage medium 1230 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Information and signals described herein can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination of such. Some drawings can illustrate signals as a single signal; however, it will be understood by a person of ordinary skill in the art that the signal can represent a bus of signals, where the bus can have a variety of bit widths.

The terms "electronic communication," "conductive contact," "connected," and "coupled" can refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) can be an open circuit or a closed circuit based on the operation of the device that includes the connected components. The conductive path between connected components can be a direct conductive path between the components or the conductive path between connected components can be an indirect conductive path that can include intermediate components, such as switches, transistors, or other components. In some cases, the flow of signals between the connected components can be interrupted for a time, for example, using one or more intermediate components such as switches or transistors.

The devices discussed herein, including a memory array, can be formed on a semiconductor substrate, such as silicon, germanium, silicon-germanium alloy, gallium arsenide, gallium nitride, etc. In some cases, the substrate is a semiconductor wafer. In other cases, the substrate can be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, can be controlled through doping using various chemical species including, but not limited to, phosphorous, boron, or arsenic. Doping can be performed during the initial formation or growth of the substrate, by ion-implantation, or by any other doping means.

A switching component or a transistor discussed herein can represent a field-effect transistor (FET) and include a three terminal device including a source, drain, and gate. The terminals can be connected to other electronic elements through conductive materials, e.g., metals. The source and drain can be conductive and can include a heavily-doped, e.g., degenerate, semiconductor region. The source and drain can be separated by a lightly-doped semiconductor region or channel. If the channel is n-type (i.e., majority carriers are signals), then the FET can be referred to as a n-type FET. If the channel is p-type (i.e., majority carriers are holes), then the FET can be referred to as a p-type FET.

The channel can be capped by an insulating gate oxide. The channel conductivity can be controlled by applying a voltage to the gate. For example, applying a positive voltage or negative voltage to an n-type FET or a p-type FET, respectively, can result in the channel becoming conductive. A transistor can be "on" or "activated" when a voltage greater than or equal to the transistor's threshold voltage is applied to the transistor gate. The transistor can be "off" or "deactivated" when a voltage less than the transistor's threshold voltage is applied to the transistor gate.

The description set forth herein, in connection with the appended drawings, describes example configurations and does not represent all the examples that can be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, can be practiced without these specific details. In some instances, well-known structures and devices are shown in block diagram form to avoid obscuring the concepts of the described examples.

In the appended figures, similar components or features can have the same reference label. Further, various components of the same type can be distinguished by following the reference label by a dash and a second label that distinguishes among the similar components. If just the first reference label is used in the specification, the description is applicable to any one of the similar components having the same first reference label irrespective of the second reference label.

The various illustrative blocks and modules described in connection with the disclosure herein can be implemented or performed with a general-purpose processor, a DSP, an ASIC, an FPGA or other programmable logic device, discrete gate or transistor logic, discrete hardware components, or any combination of such designed to perform the functions described herein. A general-purpose processor can be a microprocessor, but in the alternative, the processor can be any processor, controller, microcontroller, or state machine. A processor can also be implemented as a combination of computing devices (e.g., a combination of a DSP and a microprocessor, multiple microprocessors, one or more microprocessors in conjunction with a DSP core, or any other such configuration).

The functions described herein can be implemented in hardware, software executed by a processor, firmware, or any combination of such. If implemented in software executed by a processor, the functions can be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions can also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" can be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium can be any available medium that can be accessed by a general purpose or special purpose computer. By way of example, and not limitation, non-transitory computer-readable media can include RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein can be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    receiving, by a hardware component, a command from a firmware component, the command to generate a first cryptographic key for encrypting or decrypting user data stored on a memory device;
    generating, by the hardware component, the first cryptographic key based at least in part on the command;
    generating, by the hardware component and based at least in part on generating the first cryptographic key, an initialization vector that is based at least in part on the user data, or the first cryptographic key, or a combination thereof;
    encrypting, by the hardware component, the first cryptographic key using a second cryptographic key stored at a first register of a set of registers of the hardware component and the initialization vector; and
    communicating the encrypted first cryptographic key to a nonvolatile memory device for storage, the nonvolatile memory device separate from the hardware component.

2. The method of claim 1, further comprising:
generating, by the hardware component, error correction information for the encrypted first cryptographic key; and
communicating the error correction information to the nonvolatile memory device for storage based at least in part on communicating the encrypted first cryptographic key to the nonvolatile memory device for storage.

3. The method of claim 1, further comprising:
storing the first cryptographic key in a first volatile memory device of the hardware component, wherein the first cryptographic key comprises an encryption key for encrypting the user data.

4. The method of claim 3, further comprising:
storing a third cryptographic key in a second volatile memory device of the hardware component, wherein the third cryptographic key comprises a decryption key for decrypting the user data, and wherein the first volatile memory device is different than the second volatile memory device.

5. The method of claim 3, further comprising:
receiving, by the hardware component, the encrypted first cryptographic key from the nonvolatile memory device; and
performing an error correction operation on the first cryptographic key stored in the first volatile memory device based at least in part on the receiving the encrypted first cryptographic key.

6. The method of claim 1, further comprising:
receiving, from a host device, an access command associated with the user data stored on the memory device; and
encrypting or decrypting the user data using the first cryptographic key and the initialization vector based at least in part on the receiving the access command.

7. The method of claim 1, further comprising:
receiving, by the hardware component, the encrypted first cryptographic key from the nonvolatile memory device; and
decrypting, by the hardware component, the encrypted first cryptographic key using the second cryptographic key and the initialization vector.

8. The method of claim 7, further comprising:
receiving, by the hardware component, error correction information associated with the encrypted first cryptographic key from the nonvolatile memory device; and
performing, by the hardware component, an error correction operation on the encrypted first cryptographic key based at least in part on the receiving the error correction information, wherein decrypting the encrypted first cryptographic key is based at least in part on the performing the error correction operation.

9. The method of claim 1, further comprising:
receiving, by the hardware component, a second command to generate an updated first cryptographic key for encrypting or decrypting the user data stored on the memory device;
generating, by the hardware component, the updated first cryptographic key based at least in part on the receiving the second command; and
encrypting, by the hardware component, the updated first cryptographic key using the second cryptographic key and the initialization vector.

10. The method of claim 9, further comprising:
detecting, by the hardware component, that a quantity of errors within the encrypted first cryptographic key satisfies a threshold of errors, wherein the receiving the second command is based at least in part on detecting that the quantity of errors within the encrypted first cryptographic key satisfies the threshold of errors.

11. The method of claim 9, wherein generating the updated first cryptographic key further comprises:
generating a first set of random data;
determining that the first set of random data and the first cryptographic key comprise a same set of data;
generating a second set of random data based at least in part on the determining that the first set of random data and the first cryptographic key comprise the same set of data; and
determining that the second set of random data and the first cryptographic key comprise a different set of data, wherein the updated first cryptographic key comprises the second set of random data based at least in part on the determining that the second set of random data and the first cryptographic key comprise the different set of data.

12. The method of claim 1, further comprising:
generating, by the hardware component, a third cryptographic key associated with the first cryptographic key, wherein the third cryptographic key is different than the first cryptographic key, and wherein one of the first cryptographic key or the third cryptographic key is for encrypting the user data and the other of the first cryptographic key or the third cryptographic key is for decrypting the user data.

13. A system, comprising:
a random information generator of a hardware component configured to generate a first cryptographic key for encrypting or decrypting user data stored on a memory device;
a volatile memory device of the hardware component configured to store the first cryptographic key;
an encryption engine of the hardware component configured to:
generate an initialization vector that is based at least in part on the user data, or the first cryptographic key, or a combination thereof, and
encrypt the first cryptographic key using a second cryptographic key stored at a first register of a set of registers of the hardware component and the initialization vector; and
a buffer of the hardware component configured to store the encrypted first cryptographic key during a communication of the encrypted first cryptographic key associated with the system and a firmware component.

14. The system of claim 13, further comprising an error correction code (ECC) encoder configured to:
generate error correction information for performing an error correction operation on the encrypted first cryptographic key; and
store the encrypted first cryptographic key and the error correction information at the buffer.

15. The system of claim 13, further comprising an error correction code (ECC) decoder configured to:
receive error correction information and the encrypted first cryptographic key from the buffer; and
perform an error correction operation on the encrypted first cryptographic key using the error correction information.

16. The system of claim 13, further comprising a decryption engine configured to:
receive the encrypted first cryptographic key from the buffer; and decrypt the encrypted first cryptographic key using the second cryptographic key and the initialization vector.

17. The system of claim 13, wherein the set of registers receives the second cryptographic key from the firmware component.

18. A method, comprising:

receiving, by a hardware component from a nonvolatile memory device, an encrypted first cryptographic key and a second cryptographic key, wherein the encrypted first cryptographic key is for encrypting or decrypting user data stored on a memory device, and wherein the second cryptographic key is stored at a first register of a set of registers of the hardware component;

generating, by the hardware component, an initialization vector that is based at least in part on the user data, or the first cryptographic key, or a combination thereof;

decrypting, by the hardware component, the encrypted first cryptographic key using the second cryptographic key and the initialization vector; and storing the first cryptographic key in a volatile memory device on the hardware component based at least in part on decrypting the encrypted first cryptographic key.

19. The method of claim 18, further comprising:

receiving, by the hardware component from the nonvolatile memory device, error correction information associated with the encrypted first cryptographic key; and performing, by the hardware component, an error correction operation on the encrypted first cryptographic key using the error correction information.

20. The method of claim 18, further comprising:

receiving, from a host device, an access command associated with the user data stored on the memory device; and encrypting or decrypting the user data using the first cryptographic key and the initialization vector based at least in part on the receiving the access command.

* * * * *